US009214678B2

(12) United States Patent
Mikhaylik (10) Patent No.: US 9,214,678 B2
(45) Date of Patent: Dec. 15, 2015

(54) POROUS SUPPORT STRUCTURES, ELECTRODES CONTAINING SAME, AND ASSOCIATED METHODS

(71) Applicant: Sion Power Corporation, Tucson, AZ (US)

(72) Inventor: Yuriy V. Mikhaylik, Tucson, AZ (US)

(73) Assignee: Sion Power Corporation, Tucson, AZ (US)

( * ) Notice: Subject to any disclaimer, the term of this patent is extended or adjusted under 35 U.S.C. 154(b) by 11 days.

(21) Appl. No.: 13/789,783

(22) Filed: Mar. 8, 2013

(65) Prior Publication Data

US 2013/0252103 A1    Sep. 26, 2013

Related U.S. Application Data

(60) Provisional application No. 61/608,950, filed on Mar. 9, 2012.

(51) Int. Cl.
| H01M 4/04 | (2006.01) |
| H01M 4/80 | (2006.01) |
| H01M 4/38 | (2006.01) |
| H01M 4/66 | (2006.01) |

(52) U.S. Cl.
CPC ... *H01M 4/80* (2013.01); *H01M 4/04* (2013.01); *H01M 4/38* (2013.01); *H01M 4/661* (2013.01); *Y02E 60/122* (2013.01); *Y10T 29/49117* (2015.01)

(58) Field of Classification Search
CPC .......................................................... H01M 4/04
USPC ......................................................... 429/218
See application file for complete search history.

(56) References Cited

U.S. PATENT DOCUMENTS

| 2,877,113 | A | 3/1959 | Fitzer |
| 4,116,804 | A | 9/1978 | Needes |
| 4,331,477 | A | 5/1982 | Kubo et al. |
| 4,664,991 | A | 5/1987 | Perichaud et al. |
| 4,739,018 | A | 4/1988 | Armand et al. |
| 4,833,048 | A | 5/1989 | Dejonghe et al. |
| 4,917,974 | A | 4/1990 | De Jonghe et al. |
| 5,162,175 | A | 11/1992 | Visco et al. |
| 5,324,599 | A | 6/1994 | Oyama et al. |
| 5,441,831 | A | 8/1995 | Okamoto et al. |
| 5,516,598 | A | 5/1996 | Visco et al. |
| 5,529,860 | A | 6/1996 | Skotheim et al. |
| 5,601,947 | A | 2/1997 | Skotheim et al. |
| 5,648,187 | A | 7/1997 | Skotheim |
| 5,690,702 | A | 11/1997 | Skotheim et al. |
| 5,723,230 | A | 3/1998 | Naoi et al. |
| 5,783,330 | A | 7/1998 | Naoi et al. |
| 5,792,575 | A | 8/1998 | Naoi et al. |
| 5,882,819 | A | 3/1999 | Naoi et al. |
| 5,919,587 | A | 7/1999 | Mukherjee et al. |
| 5,961,672 | A | 10/1999 | Skotheim et al. |
| 6,117,590 | A | 9/2000 | Skotheim et al. |
| 6,201,100 | B1 | 3/2001 | Gorkovenko et al. |
| 7,247,408 | B2 | 7/2007 | Skotheim et al. |
| 2005/0048371 | A1 | 3/2005 | Nagayama et al. |
| 2006/0193889 | A1* | 8/2006 | Spradlin et al. ............... 424/423 |
| 2006/0238203 | A1 | 10/2006 | Kelley et al. |
| 2007/0221265 | A1 | 9/2007 | Affinito et al. |
| 2007/0224502 | A1 | 9/2007 | Affinito et al. |
| 2008/0187663 | A1 | 8/2008 | Affinito |
| 2008/0318128 | A1 | 12/2008 | Simoneau et al. |
| 2009/0098457 | A1 | 4/2009 | Kwon et al. |
| 2009/0200986 | A1 | 8/2009 | Kopera et al. |
| 2010/0035128 | A1 | 2/2010 | Scordilis-Kelley et al. |
| 2010/0129699 | A1 | 5/2010 | Mikhaylik et al. |
| 2011/0059361 | A1 | 3/2011 | Wilkening et al. |
| 2011/0070491 | A1 | 3/2011 | Campbell et al. |
| 2011/0070494 | A1 | 3/2011 | Campbell et al. |
| 2011/0076560 | A1 | 3/2011 | Scordilis-Kelley et al. |
| 2011/0177398 | A1 | 7/2011 | Affinito et al. |
| 2011/0206992 | A1 | 8/2011 | Campbell et al. |
| 2012/0048729 | A1 | 3/2012 | Mikhaylik et al. |
| 2012/0070746 | A1 | 3/2012 | Mikhaylik et al. |

FOREIGN PATENT DOCUMENTS

| JP | 2005-251429 A | 9/2005 |
| JP | 2005-310836 A | 11/2005 |
| WO | WO 99/33130 A1 | 7/1999 |
| WO | WO 2009/017726 A1 | 2/2009 |
| WO | WO 2009/042071 A2 | 4/2009 |
| WO | WO 2009/054987 A1 | 4/2009 |
| WO | WO 2009/089018 A2 | 7/2009 |

OTHER PUBLICATIONS

"A three-dimensional tin-coated nanoporous copper for lithium-ion battery anodes" Journal of Power Sources 196 (2011) 6915-6919.*

(Continued)

*Primary Examiner* — Ula Ruddock
*Assistant Examiner* — Jacob Marks
(74) *Attorney, Agent, or Firm* — Wolf, Greenfield & Sacks, P.C.

(57) ABSTRACT

Electrodes comprising metal support structures and methods for making the same are generally described. In certain embodiments, the electrodes described herein comprise a metal porous support structure, and an electrode active material at least partially contained within the pores of the porous support structure. In some embodiments, the electrical conductivity of the porous support structure material can ensure that electrons are efficiently transferred through and/or out of the electrode (e.g., to a current collector and/or to an external circuit). The pores within the porous support structure can ensure, in certain embodiments, that the electrode active material is accessible to the electrolyte, thereby enhancing performance of the electrochemical cell in which the electrode is used.

19 Claims, 3 Drawing Sheets

(56) References Cited

OTHER PUBLICATIONS

International Search Report and Written Opinion for Application No. PCT/US2013/029905 mailed Jun. 3, 2013.

Ahn et al., Electrochemical Properties of Sulfur with Various Particle Size for Lithium Sulfur Batteries. 44th Power Sources Conference. Jun. 14-17, 2010. 130-133.

Brunauer et al., Adsorption of Gases in Multimolecular Layers. J Am Chem Soc. 1938;60(2):309-19.

Choi et al., Challenges facing lithium batteries and electrical double-layer capacitors. Angew Chem Int Ed Engl. Oct. 1, 2012;51(40):9994-10024. doi:10.1002/anie.201201429. Epub Sep. 10, 2012.

Hassoun et al., A High-Performance Polymer Tin Sulfur Lithium Ion Battery. Angew. Chem. Int. Ed. 2010, 49, 2371-2374.

Hayashi et al., All-solid-state rechargeable lithium batteries with Li2S as a positive electrode material. Journal of Power Sources 183 (2008) 422-426.

Lai et al., Synthesis and Electrochemical Performance of Sulfur/Highly Porous Carbon Composites. J. Phys. Chem. C 2009, 113, 4712-4716.

Mikhaylik et al., Increasing Li-S Battery Cycle Life, and Improving Safety, through Application of a Variety of Coating Techniques. Society Vacuum Coaters. 2011. 54th Annual Technical Conference Proceedings. 589-592.

Takeuchi et al., Preparation of electrochemically active lithium sulfide—carbon composites using spark-plasma-sintering process. Journal of Power Sources 195 (2010) 2928-2934.

Wang et al., Polymer lithium cells with sulfur composites as cathode materials. Electrochimica Acta 48 (2003) 1861-1867.

Zhang et al., Enhancement of long stability of sulfur cathode by encapsulating sulfur into micropores of carbon spheres. Energy & Environmental Science. 2010, 3, 1531-1537.

Zheng et al., Novel nanosized adsorbing sulfur composite cathode materials for the advanced secondary lithium batteries. Electrochimica Acta. Jan. 5, 2006;51(7):1330-35.

International Preliminary Report on Patentability mailed Jul. 1, 2014 for Application No. PCT/US2013/029905.

\* cited by examiner

FIG. 3

POROUS SUPPORT STRUCTURES, ELECTRODES CONTAINING SAME, AND ASSOCIATED METHODS

RELATED APPLICATIONS

This application claims priority under 35 U.S.C. §119(e) to U.S. Provisional Patent Application Ser. No. 61/608,950, filed Mar. 9, 2012, and entitled "Porous Support Structures, Electrodes Containing Same, and Associated Methods," which is incorporated herein by reference in its entirety for all purposes.

TECHNICAL FIELD

Porous support structures, electrodes comprising the same, and associated methods are generally described. In certain embodiments, porous support structures for electrodes can be made by removing at least a portion of a component from a metal alloy.

BACKGROUND

An electrochemical cell typically includes a cathode and an anode which participate in an electrochemical reaction to produce current. Generally, electrochemical reactions are facilitated by an electrolyte, which can contain free ions and can behave as an ionically conductive medium.

The performance of an electrochemical cell can be enhanced by increasing the amount of contact between an electrode active material and the electrolyte, which can lead to an increase in the rate of the electrochemical reaction within the cell. In addition, the performance of an electrochemical cell can be enhanced by maintaining a high degree of electrical conductivity within the bulk of the electrodes. In some previous electrochemical cells, these objectives can be accomplished to some extent by employing porous electrodes comprising an electrode active material positioned on or within a support structure, such as an agglomeration of porous carbon particles. Electrode structures, and associated methods for making such structures, that further enhance the availability of the electrode active material and the electrical conductivity within the bulk of the electrode would be desirable.

SUMMARY

Porous support structures, electrodes comprising the same, and associated methods are generally described. The subject matter of the present invention involves, in some cases, interrelated products, alternative solutions to a particular problem, and/or a plurality of different uses of one or more systems and/or articles.

In one aspect, an electrode is provided. The electrode comprises, in certain embodiments, a porous support structure comprising a metal; and an electrode active material at least partially contained within the pores of the porous support structure. In some embodiments, an external geometric surface of the porous support structure has a root mean square surface roughness of less than about 100 micrometers when measured while ignoring contributions from features with maximum external geometric surface cross-sectional dimensions of less than 5 micrometers.

In another aspect, a method of making an electrode is provided. In some embodiments, the method comprises depositing an electrode active material within the pores of a porous support structure that is made by removing at least a portion of at least one metal component from an alloy. Electrodes obtainable by such methods and electrochemical cells comprising electrodes obtainable by such methods are also provided.

In one set of embodiments, a porous support structure that is made by removing at least a portion of at least one metal component from an alloy is used to form an electrode.

Other advantages and novel features of the present invention will become apparent from the following detailed description of various non-limiting embodiments of the invention when considered in conjunction with the accompanying figures. In cases where the present specification and a document incorporated by reference include conflicting and/or inconsistent disclosure, the present specification shall control.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures.

DETAILED DESCRIPTION

Porous support structures, electrodes comprising the same, and associated methods are generally described. In certain embodiments, part or substantially all of the porous support structure can be made of one or more metals. In certain embodiments, the electrodes described herein comprise a porous support structure, and an electrode active material at least partially contained within the pores of the porous support structure. In some embodiments, the electrical conductivity of the porous support structure material (e.g., metal) can ensure that electrons are efficiently transferred through and/or out of the electrode (e.g., to a current collector and/or to an external circuit). The pores within the porous support structure can ensure, in certain embodiments, that the electrode active material is accessible to the electrolyte, thereby enhancing performance of the electrochemical cell in which the electrode is used.

In certain embodiments, the starting material for forming the porous support structure can be a metal alloy comprising at least a first metal component and at least a second metal component. The porous support structure of the electrode can be made by removing at least a portion of at least one of the components from the metal alloy to leave behind at least a portion (and, in some cases, substantially all) of a second component of the metal alloy. Removal of the metal alloy component can be achieved, for example, by melting out the alloy component or chemically dissolving the alloy component. In some such embodiments, the left-behind second component (and/or additional left-behind components) can include a plurality of pores (e.g., void volume corresponding to the volume that was occupied by the removed components), thereby forming a porous support structure.

In certain embodiments, the pores of the porous support structure (e.g., made by the process outlined above) can be at least partially filled with an electrode active material, such as a sulfur-containing electrode active material. In some such embodiments, the resulting electrode includes electrode active material positioned within an electrically conductive porous framework.

It has been discovered, within the context of the invention, that the systems and methods described herein provide a number of advantages in the manufacture of electrodes, relative to prior methods. For example, in many prior methods (e.g., in which porous support structures are formed by bonding or sintering particles), the porous support structure can be rough and/or can have a variable thickness. Variations in thickness of an electrode can make it difficult to incorporate the electrode into a layered electrochemical cell (i.e., wherein the cathode, electrolyte, and anode are stacked on top of one another) while maintaining consistent contact between the electrodes and electrolyte (with optional separator). In addition, electrode surface roughness can lead to uneven dissolution and redeposition of electrode active material during use, which can shorten the lifespan of the electrochemical cell.

The advantages outlined above may be enhanced in systems in which an anisotropic force is applied to the electrochemical cell during use. U.S. Patent Publication No. 2010/0035128 to Scordilis-Kelley et al. filed on Aug. 4, 2009, entitled "Application of Force in Electrochemical Cells," (which is incorporated herein by reference in its entirety for all purposes) describes the application of force in electrochemical cells for improved electrode chemistry, morphology, and/or other characteristics indicative of improved cell performance. Some electrochemical cells (e.g., rechargeable electrochemical cells) undergo a charge/discharge cycle involving deposition of metal (e.g., lithium metal or other active material) on a surface of an electrode (e.g., anode) upon charging and reaction of the metal on the electrode surface, wherein the metal diffuses from the anode surface, upon discharging. The uniformity with which the metal is deposited in such cells may affect cell performance. As one non-limiting example, when lithium metal is removed from and/or redeposited on an anode, it may, in some cases, result in an uneven surface; for example, upon redeposition, lithium may deposit unevenly forming a rough surface. The roughened surface may increase the amount of lithium metal available for undesired chemical reactions which may result in decreased cycling lifetime and/or poor cell performance. The application of an anisotropic force with a component normal to an electrode active surface within the electrochemical cell has been found to reduce such behavior and to improve the cycling lifetime and/or performance of the cell.

However, when anisotropic forces are applied to electrochemical cells containing electrodes with rough exterior surfaces and/or uneven thicknesses, cell performance can be adversely impacted. For example, if the external surface of an electrode within an electrochemical cell is rough, application of an anisotropic force to the electrochemical cell might cause the electrode to penetrate or tear the separator, thereby causing an electrical short and making the cell unsuitable for use. As another example, if the thickness of an electrode within an electrochemical cell is inconsistent, it can become difficult to apply the anisotropic force evenly across the electrochemical cell, diminishing the beneficial effects (including those outlined above) of applying the force. Accordingly, the ability to precisely control the exterior surface roughness and thickness of the electrode porous support structures, as described herein, can allow one to avoid these problems and take full advantage of the benefits conferred via the application of an anisotropic force to the electrochemical cell in which the electrode is to be used.

In addition to the advantages outlined above, the electrochemical cells described herein can be particularly useful in systems in which an anisotropic force is applied, in certain embodiments, because they can be constructed and arranged to withstand an applied anisotropic force while maintaining their structural integrity. In many prior systems in which the porous support structure is fabricated by agglomerating electrically conductive particles, the resulting porous support structure is relatively fragile and can collapse upon application of a force. In contrast, the porous support structures described herein can include an interconnected web of metal, which can be configured to withstand a large amount of force without yielding, thereby maintaining the structural integrity of the electrode during use.

The systems and methods described herein can also allow one to precisely control the total porosity and/or pore distribution of the porous support structures used to form electrodes, in certain embodiments. The ability to control these properties can allow one to control the degree to which the electrode active material within the porous support structure is accessible to the electrolyte.

Figure 1A:
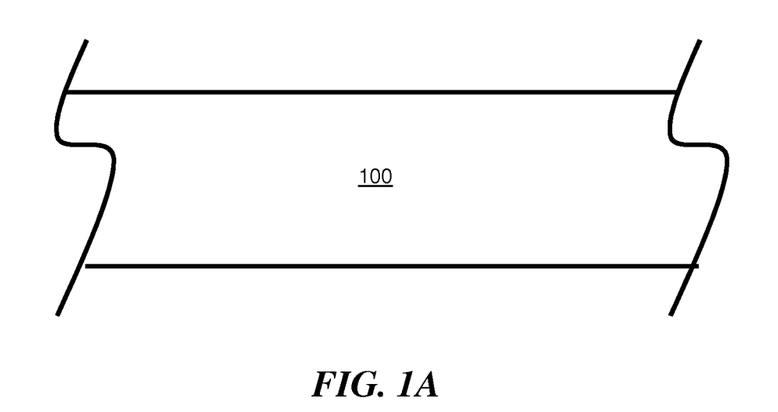
FIGS. 1A-1C are cross-sectional schematic illustrations outlining a set of embodiments in which an electrode comprising a porous support structure is made.

In one aspect, inventive electrodes and methods for making the same are provided. FIGS. 1A-1C are schematic cross-sectional illustrations outlining one set of methods by which inventive electrodes can be made. FIG. 1A depicts a portion of a cross section of a metal alloy 100. Metal alloy 100 can be used to form a porous support structure, according to certain embodiments. The metal alloys described herein can have at least two, at least three, at least four, or more metal components. A metal in an alloy can be in its elemental form in certain embodiments. In some embodiments, the metal alloy comprises aluminum, nickel, iron, titanium, and/or copper. For example, in one set of embodiments, the metal alloy comprises an aluminum component and a copper component (and, in some such embodiments, substantially no other components). Other examples of metals that can form at least a portion of a metal alloy are described in more detail below.

In certain embodiments, at least about 50 wt % (i.e., 50% by weight), at least about 75 wt %, at least about 90 wt %, at least about 95 wt %, at least about 99 wt %, or substantially all of the metal alloy is made up of metals (i.e., a relatively low amount of the alloy is made up of non-metal components such as oxygen, nitrogen, etc.).

Figure 1B:
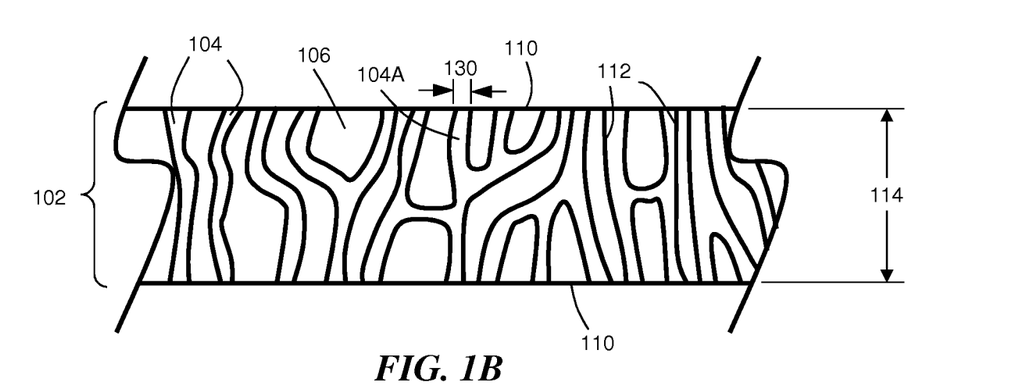
Figure 1C:
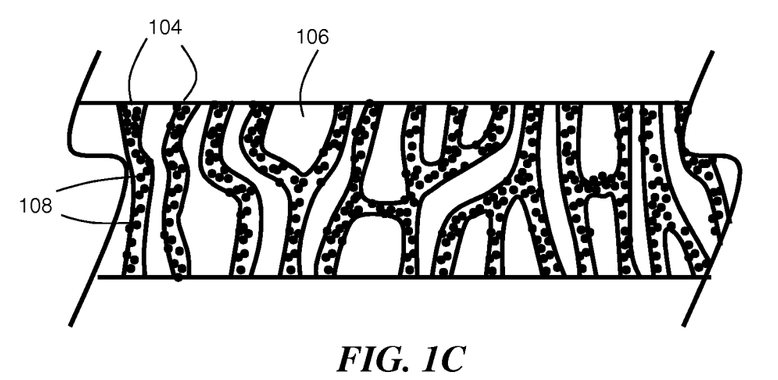

In certain embodiments, at least a portion of at least one metal component can be removed from the alloy, leaving behind a porous support structure comprising the remaining metal. For example, FIG. 1B is a schematic cross-sectional illustration of a portion of a metal alloy 100 from which at least a portion of at least one metal component has been removed, leaving behind a porous support structure 102 comprising pores 104 and solid metal phase 106. The metal component that is removed to form porous support structure 102 is sometimes referred to herein as the "leaving metal component," while the component that is left behind to form the porous support structure is sometimes referred to herein as the "staying metal component." In some embodiments, an electrode active material 108 can be positioned within the pores 104 of porous support structure 102 to form an electrode, as described in more detail below.

In certain embodiments, pores 104 of porous support structure 102 can be formed by removing a single type of metal component (e.g., aluminum) from alloy 100. In other embodiments, more than one type of metal component (e.g., aluminum and one or more other types of metal) can be removed from metal alloy 100 to form pores 104.

In some embodiments, a relatively large amount of the leaving metal component(s) can be removed from the metal alloy to form a porous support structure. For example, in certain embodiments, at least about 50 vol %, at least about 75 vol %, at least about 90 vol %, at least about 95 vol %, or at least about 99 vol % of at least one of the leaving metal components that are present within the metal alloy is removed to form the porous support structure. As one illustrative example, in some embodiments, the metal alloy comprises aluminum as a leaving metal component, and the porous support structure is formed by removing at least about 50 vol % (or at least about 75 vol %, at least about 90 vol %, at least about 95 vol %, or at least about 99 vol %) of the aluminum from the metal alloy to form the porous support structure. In certain embodiments, at least about 50 vol %, at least about 75 vol %, at least about 90 vol %, at least about 95 vol %, or at least about 99 vol % of all of the leaving metal components that are present within the metal alloy are removed to form the porous support structure. For example, in some embodiments in which two or more leaving metal components are present in the metal alloy, at least about 50 vol % (or at least about 75 vol %, at least about 90 vol %, at least about 95 vol %, or at least about 99 vol %) of all of those leaving metal components are removed to form the porous support structure.

In some embodiments, a leaving metal component(s) is selectively removed from a metal alloy, such that a relatively large amount of the staying metal component remains intact. In certain embodiments, when the process of removing the leaving metal component(s) is complete, at least about 75 vol %, at least about 90 vol %, at least about 95 vol %, at least about 99 vol %, or substantially all of the staying metal component remains (e.g., to form a porous support structure). In certain embodiments, the ratio of the volume of leaving metal component(s) removed from the alloy to the ratio of staying metal component(s) removed from the alloy is at least about 10:1, at least about 50:1, at least about 100:1, at least about 1000:1, at least about $10^5$:1, or at least about $10^6$:1.

The leaving metal component can be removed via a variety of methods. For example, in certain embodiments, removing at least a portion of at least one metal component from the alloy comprises chemically treating at least a portion of the at least one metal component. In certain embodiments, one or more chemicals can be used to remove a component of the metal alloy, for example, by etching or otherwise reacting with the component and/or by dissolving the component. In certain embodiments, the metal alloy can be treated with an acid, a base, and/or an oxidant to remove one or more components from the metal alloy.

In one non-limiting example, the metal alloy can comprise aluminum, and a hydroxide solution (e.g., a solution of NaOH, KOH, or other hydroxide salts) can be used to remove the aluminum from the metal alloy. In some embodiments, the starting alloy comprises aluminum and copper, and copper is left behind to form at least a portion of (e.g., all or part of) the porous support structure. In some instances, the starting alloy comprises aluminum and nickel, and nickel is left behind to form at least a portion of the porous support structure. The starting alloy may comprise, in certain embodiments, aluminum and iron, and iron can be left behind to form at least a portion of the porous support structure. In certain instances, the starting metal alloy can comprise aluminum and titanium, and titanium can be left behind to form all or part of the porous support structure.

As another example, in some embodiments, the starting alloy can comprise one or more noble metals (e.g., ruthenium, rhodium, palladium, silver, osmium, iridium, platinum, and/or gold) and aqua regia can be used to remove at least a portion of the noble metal(s). The aqua regia can be formed, for example, by mixing concentrated nitric acid and hydrochloric acid, for example, in a volume ratio of about 1:3, respectively. In some embodiments in which aqua regia is used, the starting alloy comprises a metal that is resistant to removal by aqua regia, such as titanium or tantalum, such that the metal that is left behind forms the porous support structure.

In certain embodiments, removing at least a portion of at least one metal component from the alloy comprises melting at least a portion of the at least one metal component. For example, in some embodiments, the metal alloy can be heated to a temperature above the melting point of at least one metal component that is to be removed and below the melting point of at least one other component of the metal alloy. The component(s) of the metal alloy with a melting point above the temperature to which the metal alloy is heated may remain intact and form a porous support structure, in certain embodiments.

As one non-limiting example, in some embodiments, the metal alloy comprises aluminum (which has a melting point of about 660° C.) and nickel (which has a melting point of about 1453° C.). The metal alloy can be heated to a temperature between the melting points of aluminum and nickel (e.g., between a temperature of about 600° C. and about 1453° C.) such that at least a portion of the aluminum component (and in some cases, all of the aluminum component) is melted, while the nickel component remains solid. The liquefied aluminum can then flow out of the alloy, leaving behind a porous support structure comprising nickel.

Removal of at least one component of the metal alloy can comprise, in certain embodiments, a combination of a heating step and a chemical treatment step, including those described above.

In certain embodiments, the leaving metal component comprises aluminum. The use of aluminum as a leaving metal component can be particularly useful in certain cases because aluminum can be readily removed from a large variety of metal alloys while maintaining a controlled porosity, surface smoothness, and other desirable features, including those outlined below. In certain embodiments, aluminum can be present in the starting metal alloy in an amount from about 40% to about 95%, from about 60% to about 95%, from about 70% to about 95%, or from about 80% to about 95%, by weight. In certain embodiments, nickel, iron, titanium, and/or copper can be present, along with the aluminum, to form a starting metal alloy with two or more metal components. In certain embodiments, the starting metal alloy comprises aluminum and nickel. The invention is not limited to the use of aluminum as a leaving metal component, however, and in other embodiments, other metals can be used as a leaving metal component.

It should be understood that, while binary metal alloys have been primarily described as starting metal alloys, the invention is not so limited, and in certain embodiments, the starting metal alloy can include at least three, at least four, or more metal components.

One advantage of certain of the systems and methods described herein is that they can be used to form porous support structures comprising relatively smooth exterior surfaces. In certain embodiments, one or more (e.g., all) of the external geometric surfaces of the porous support structure can be relatively smooth. As used herein, the "external geometric surface" of an article refers to the surface defining the outer boundaries of the particle when analyzed at substantially the same scale as the maximum cross-sectional dimension of the particle. Generally, the external geometric surface of a particle does not include the internal surfaces, such as the surfaces defined by pores within a porous article. As one non-limiting example, porous support structure 102 comprises external geometric surfaces 110. Surfaces 112 of pores 104, on the other hand, do not constitute external geometric surfaces of porous support structure 102.

In certain embodiments, one or more (e.g., all) of the external geometric surfaces of the porous support structure has a root mean square (RMS) surface roughness of less than about 100 micrometers, less than about 75 micrometers, less than about 50 micrometers, or less than about 25 micrometers (e.g., between about 5 micrometers and about 100 micrometers, between about 5 micrometers and about 75 micrometers, between about 5 micrometers and about 50 micrometers, or between about 5 micrometers and about 25 micrometers), when the root mean square surface roughness is measured while ignoring contributions from surface features with maximum external geometric surface cross-sectional dimensions of less than 5 micrometers. One of ordinary skill in the art would be familiar with the root mean square surface roughness of a given surface, which has units of length. The root mean square surface roughness can be determined using profilometry, and is generally calculated by determining the distance between the surface being measured and a hypothetical smooth surface at a number of points, and calculating the root mean square of the resulting measurements.

A "maximum external geometric surface cross-sectional diameter" of a feature refers to the largest distance between two points on the boundary of the feature and is measured along the external geometric surface of the article in which the feature is formed. For example, in the set of embodiments illustrated in FIG. 1B, the maximum external geometric surface cross-sectional dimension of pore 104A corresponds to dimension 130, which is measured along external geometric surface 110 of porous support structure 102.

One of ordinary skill in the art would be capable of determining the root mean square surface roughness of an article, while ignoring contributions from surface features with maximum external geometric surface cross-sectional dimensions of less than 5 micrometers, for example, using a profilometer. For example, when using a mechanical profilometer to determine the RMS surface roughness, contributions from surface features with maximum external geometric surface cross-sectional dimensions of less than 5 micrometers can be ignored by using a profilometer stylus with a diameter of 5 micrometers. As another example, when using an optical profilometer to determine the RMS surface roughness, contributions from surface features with maximum external geometric surface cross-sectional dimensions of less than 5 micrometers can be ignored by adjusting the magnification of the optical profilometer such that features with maximum external geometric surface cross-sectional dimensions of less than 5 micrometers do not appear in the measurement plane.

In certain embodiments, the average cross-sectional diameter of the pores within the porous support structure can be at least about 2 times or at least about 5 times smaller than the RMS surface roughness of the external geometric surface of the porous support structure (when the RMS surface roughness is measured while ignoring contributions from features with maximum external geometric surface cross-sectional dimensions of less than 5 micrometers, as described above).

Another advantage of certain of the systems and methods described herein is that they can be used to produce relatively flat porous support structures. For example, in certain embodiments, the porous support structure can be in the form of a flat, porous sheet, such as porous support structure 102 illustrated in FIG. 2 (in which the pores are not illustrated, for purposes of clarity). The porous support structure can include first and second relatively long orthogonal dimensions (e.g., dimensions 202 and 204 in FIG. 2) defining two opposed flat external geometric surfaces (e.g., external geometric surfaces 110). The flat porous support structure can also include a third dimension orthogonal to the first and second dimensions that defines the thickness of the porous support structure. The thickness of such a porous support structure can be measured as the distance between the external geometric surfaces that bound the porous support structure. For example, in FIGS. 1B and 2, the thickness of porous support structure 102 corresponds to the distance between external geometric surfaces 110, illustrated as dimension 114. The thickness of the porous support structure can be, in some embodiments, relatively consistent across one or more external geometric surfaces of the porous support structure (e.g., across geometric surfaces 110 in FIG. 2), thereby resulting in a flat porous support structure. For example, in FIG. 2, thickness 114 can be relatively consistent across geometric surfaces 110.

Figure 2:
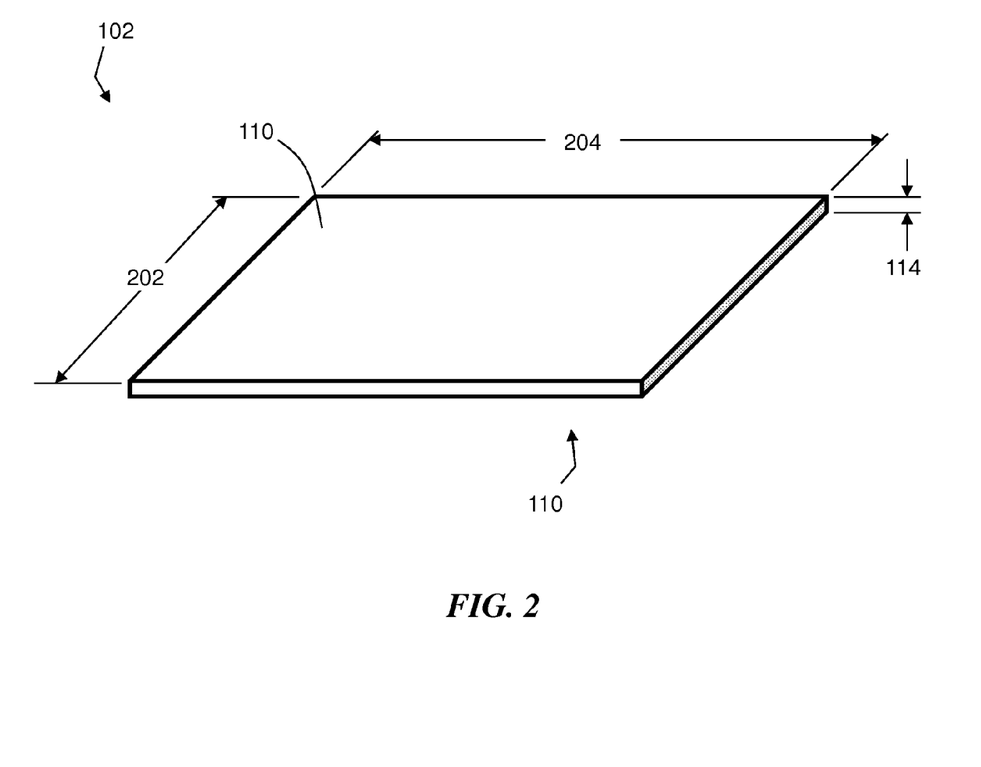
FIG. 2 is a perspective view schematic illustration of a support structure, according to one set of embodiments.

The porous support structure can have an average thickness, which can be determined by measuring the thickness of the porous support structure at a statistically representative number of points along an external geometric surface (e.g., surfaces 110) of the porous support structure. In certain embodiments, the thickness of the porous support structure does not vary across an external geometric surface of the porous support structure by more than about 10%, more than about 5%, more than about 2%, more than about 1%, or more than about 0.1% of the average thickness of the porous support structure.

As noted above, the ability to produce flat and/or smooth porous support structures can provide a number of advantages. For example, flat and/or smooth porous support structures can be particularly useful in forming electrodes for electrochemical cells configured to withstand the application of an anisotropic force during charge and/or discharge.

Flat and/or smooth porous support structures can be formed by ensuring that the starting metal alloy material is itself flat and/or smooth. Accordingly, in certain embodiments, the metal alloy from which the porous support structure is formed can have any of the flatness and/or smoothness properties outlined above. In certain embodiments, the metal alloy from which the porous support structure is formed can be dense, for example, having a total porosity of less than about 5%, less than about 1%, or less than about 0.1%. Exemplary starting alloys from which the porous support structures described herein can be formed include, but are not limited to, metal foils and flat, smooth sheet metals.

Another advantage of the systems and methods described herein is that the total porosity and pore size distribution of the porous support structure can be controlled relatively easily. As used herein, a "pore" refers to a pore as measured using ASTM Standard Test D4284-07, and generally refers to a conduit, void, or passageway, at least a portion of which is surrounded by the medium in which the pore is formed. Generally, voids within a material that are completely surrounded by the material (and thus, not accessible from outside the material, e.g. closed cells) are not considered pores within the context of the invention. Pores may comprise any suitable cross-sectional shape including irregular shapes and regular shapes (e.g., substantially circular shapes, substantially elliptical shapes, substantially polygonal shapes, and the like).

In certain embodiments, the total porosity of the porous support structure can be controlled by adjusting the relative amount of the leaving metal component(s) within the starting metal alloy. As one particular example, if a porous support structure with a total porosity of 85% is desired, by using a starting metal alloy including 85 vol % (i.e., 85% by volume) of the leaving metal component(s). Similarly, a total porosity of 65% can be achieved by using a starting metal alloy including 65 vol % (i.e., 85% by volume) of the leaving metal component(s). When the leaving metal component(s) is removed, the volume originally occupied by the leaving component(s) will be replaced by void volume, thereby imparting the desired total porosity.

In addition, the pore size distribution of and location of the pores within the porous support structure can be controlled by controlling the distribution of the leaving metal component(s) within the starting metal alloy. For example, to control the distribution of the leaving metal component within the starting metal alloy (thereby controlling the distribution of the pores within the resulting porous support structure), one could make the metal alloy by selecting appropriate metal alloy components, selecting appropriate sizes and shapes of the pure component pieces that are melted or otherwise processed to form the starting metal alloy, and/or adjust the processing conditions (e.g., temperature, heating time, etc.) used to form the starting metal alloy from its constituent components.

As one particular example, a starting metal alloy of aluminum and nickel can be fabricated by laminating alternating layers of nickel and aluminum foils. The relative amounts of nickel and aluminum used in the stack can be selected such that the final alloy will have the desired relative volumes of nickel and aluminum. For example, if an alloy with 75 vol % aluminum is desired, the aluminum foils can be selected to be three times thicker than the nickel foils. In some embodiments, once the foils have been stacked, an alloying process may be used to produce the final alloy. In some embodiments, the stack can be heated to a temperature greater than the melting points of the nickel and the aluminum. In some embodiments, the alloying process can be facilitated via the application of compression and moderate elevated temperatures. In some embodiments, the alloy can be formed by stack rolling and annealing.

In certain embodiments, the porous support structure can have a relatively high total porosity. As used herein, the percentage total porosity of an article (e.g., a porous support structure) is defined as the void volume of the article divided by the volume defined by the external geometric surfaces of the article, expressed as a percentage. The void volume of an article includes the volume of pores accessible by fluid from the outside of the article, but does not include pores that are completely enclosed and therefore inaccessible by fluid from outside the article. One of ordinary skill in the art would be capable of determining the void volume of a given article using, for example, mercury intrusion porosimetry.

Electrodes comprising porous support structures with high total porosities can provide a relatively large amount of area over which electrolyte can interact with electrode active material within a relatively small volume, which can lead to gains in energy density and specific energy. In certain embodiments, the total porosity of the porous support structures described herein can be at least about 30%, at least about 45%, at least about 60%, at least about 70%, at least about 80%, or at least about 90% (and, in certain embodiments, up to about 99%, up to about 97%, or up to about 95%). Accordingly, in some embodiments, the relative amount of the leaving metal component(s) in the starting metal alloy can be at least about 30 vol %, at least about 45 vol %, at least about 60 vol %, at least about 70 vol %, at least about 80 vol %, or at least about 90 vol % (and, in certain embodiments, up to about 99 vol %, up to about 97 vol %, or up to about 95 vol %).

As noted above, the pore size distribution of the porous support structures described herein can be selected to impart favorable properties, in certain embodiments. In some embodiments, a porous support structure can be configured to include pores with cross-sectional diameters that are larger than sub-nanometer scale and single nanometer scale pores, which can become clogged and/or can be too small to allow for the passage of electrolyte (e.g., liquid electrolyte) into the pores of the porous support structure. As one specific example, in some cases in which the porous support structure is configured for use in an electrode of a lithium-sulfur battery, if the pores within the porous support structure are too small, they may become clogged with $Li_2S$, which can be formed as a side-product of the lithium-sulfur chemistry. In certain embodiments, the porous support structure can be configured to include pores with cross-sectional diameters that are smaller than millimeter-scale pores, which may be so large that they render the electrode mechanically unstable.

The distribution of the cross-sectional diameters of the pores within a given porous support structure and/or within the assembled electrode can be chosen to enhance the performance of the electrochemical cell. As used herein, the "cross-sectional diameter" of a pore refers to a cross-sectional diameter as measured using ASTM Standard Test D4284-07, which is incorporated herein by reference in its entirety. The "average cross-sectional diameter" of a plurality of pores refers to the number average of the cross-sectional diameters of each of the plurality of the pores. One of ordinary skill in the art would be capable of calculating the distribution of cross-sectional diameters and the average cross-sectional diameter of the pores within a porous structure using mercury intrusion porosimetry as described in ASTM Standard Test D4284-07. For example, the methods described in ASTM Standard Test D4284-07 can be used to produce a distribution of pore sizes plotted as the cumulative intruded pore volume as a function of pore diameter. To calculate the percentage of the total pore volume within the sample that is made up of pores within a given range of pore diameters, one would: (1) calculate the area under the curve that spans the given range over the x-axis, (2) divide the area calculated in step (1) by the total area under the curve, and (3) multiply by 100%. Optionally, in cases where the article includes pore sizes that lie outside the range of pore sizes that can be accurately measured using ASTM Standard Test D4284-07, porosimetry measurements may be supplemented using Brunauer-Emmett-Teller (BET) surface analysis, as described, for example, in S. Brunauer, P. H. Emmett, and E. Teller, *J. Am. Chem. Soc.*, 1938, 60, 309, which is incorporated herein by reference in its entirety.

In some embodiments, the total pore volume of a porous structure is described. In such embodiments, the porous support structure can be said to comprise a plurality of pores, wherein each pore of the plurality of pores has a pore volume, and the plurality of pores has a total pore volume defined by the sum of each of the individual pore volumes. In certain embodiments, at least about 50%, at least about 75%, at least about 90%, at least about 99%, or substantially all of the total pore volume in the porous support structure is defined by pores having cross-sectional diameters of less than or equal to about 5 micrometers or less than or equal to about 3 micrometers. In certain embodiments, at least about 50%, at least about 75%, at least about 90%, at least about 99%, or substantially all of the total pore volume in the porous support structure is defined by pores having cross-sectional diameters of greater than or equal to about 0.1 micrometers, greater than or equal to 0.5 micrometers, or greater than or equal to 1 micrometer (e.g., between about 0.1 micrometers and about 5 micrometers, between about 0.1 micrometers and about 3 micrometers, between about 0.5 micrometers and about 5 micrometers, between about 0.5 micrometers and about 3 micrometers, between about 1 micrometer and about 5 micrometers, or between about 1 micrometer and about 3 micrometers). Generally, the porosity of a porous support structure is determined in the absence of materials within the pores of the small-scale porous support structure. This can be achieved, for example, by removing the material (e.g., electrode active material) from the pores of the small-scale porous support structure and subsequently performing mercury intrusion porosimetry and/or by performing porosimetry before materials have been added to the small-scale porous support structure.

In some embodiments, the porous support structure may comprise pores with relatively uniform cross-sectional diameters. Not wishing to be bound by any theory, such uniformity may be useful in maintaining relatively consistent structural stability throughout the bulk of the porous support structure or a porous electrode fabricated from the porous support structure. In addition, the ability to control the pore size to within a relatively narrow range can allow one to incorporate a large number of pores that are large enough to allow for fluid penetration (e.g., electrolyte penetration) while maintaining sufficiently small pores to preserve structural stability. In some embodiments, the distribution of the cross-sectional diameters of the pores within a porous support structure or an assembled electrode can have a standard deviation of less than about 50%, less than about 25%, less than about 10%, less than about 5%, less than about 2%, or less than about 1% of the average cross-sectional diameter of the plurality of pores. Standard deviation (lower-case sigma) is given its normal meaning in the art, and can be calculated as:

$$\sigma = \sqrt{\frac{\sum_{i=1}^{n}(D_i - D_{avg})^2}{n-1}}$$

wherein $D_i$ is the cross-sectional diameter of pore i, $D_{avg}$ is the average of the cross-sectional diameters of the plurality of pores, and n is the number of pores. The percentage comparisons between the standard deviation and the average cross-sectional diameters of the pores outlined above can be obtained by dividing the standard deviation by the average and multiplying by 100%.

Yet another advantage of the systems and methods described herein is that they can be used to form mechanically robust porous support structures, even when the porous support structures include a high total porosity. Such porous support structures can be useful, for example, in electrochemical cells designed to withstand the application of an anisotropic force during charge and/or discharge. By using highly porous, but mechanically robust electrodes, the electrolyte can access the electrode active material relatively easily (thus improving energy density and specific energy) and the electrode will not collapse or otherwise substantially deform under the applied pressure (thereby retaining the desired pore distribution). In certain embodiments, the porous support structures described herein can have a yield strength of at least about 0.1 MPa, or at least about 1 MPa, or at least about 10 MPa (and/or, in certain embodiments, up to about 20 MPa).

In certain embodiments, an electrode active material can be at least partially contained within the pores of the porous support structure. Such arrangements can be useful, for example, when the porous support structure is configured to serve as the electrically conductive component of an electrode, for example, for use in an electrochemical cell. In certain embodiments, a porous support structure can be fabricated (e.g., according to the methods outlined above), and electrode active material can be subsequently added to the pores of the porous support structure. In other cases, a porous support structure that is made by removing at least a portion of at least one metal component from an alloy can be acquired from another party, and the electrode active material can be deposited within the pores of acquired porous support structure.

The electrode active material can, in certain embodiments, be fully contained within the pores of the porous support structure. In some embodiments, only a fraction of the volume of the electrode active material is contained within the pores of the porous support structure, but a substantial portion of the electrode active material, overall, is contained within the pores of the porous support structure. In certain embodiments, an electrode active material is arranged such that at least about 30 wt %, at least about 50 wt %, at least about 70 wt %, at least about 80 wt %, at least about 85 wt %, at least about 90 wt %, at least about 95 wt %, or substantially all of the electrode active material lies within the imaginary volume defined by the outer boundaries of the pores of the porous support structure.

A variety of electrode active materials can be used in association with the electrodes described herein. In certain embodiments (e.g., in some embodiments in which the electrode is used as a cathode), the electrode active material within the pores can comprise sulfur. For example, the electrode active material within the pores can comprise electroactive sulfur-containing materials. "Electroactive sulfur-containing materials," as used herein, refers to electrode active materials which comprise the element sulfur in any form, wherein the electrochemical activity involves the oxidation or reduction of sulfur atoms or moieties. As an example, the electroactive sulfur-containing material may comprise elemental sulfur (e.g., $S_8$). In some embodiments, the electroactive sulfur-containing material comprises a mixture of elemental sulfur and a sulfur-containing polymer. Thus, suitable electroactive sulfur-containing materials may include, but are not limited to, elemental sulfur, sulfides or polysulfides (e.g., of alkali metals) which may be organic or inorganic, and organic materials comprising sulfur atoms and carbon atoms, which may or may not be polymeric. Suitable organic materials include, but are not limited to, those further comprising heteroatoms, conductive polymer segments, composites, and conductive polymers. In some embodiments, an electroactive sulfur-containing material within an electrode (e.g., a cathode) comprises at least about 40 wt % sulfur. In some cases, the electroactive sulfur-containing material comprises at least about 50 wt %, at least about 75 wt %, or at least about 90 wt % sulfur.

Examples of sulfur-containing polymers include those described in: U.S. Pat. Nos. 5,601,947 and 5,690,702 to Skotheim et al.; U.S. Pat. Nos. 5,529,860 and 6,117,590 to Skotheim et al.; U.S. Pat. No. 6,201,100 issued Mar. 13, 2001, to Gorkovenko et al., and PCT Publication No. WO 99/33130. Other suitable electroactive sulfur-containing materials comprising polysulfide linkages are described in U.S. Pat. No. 5,441,831 to Skotheim et al.; U.S. Pat. No. 4,664,991 to Perichaud et al., and in U.S. Pat. Nos. 5,723,230, 5,783,330, 5,792,575 and 5,882,819 to Naoi et al. Still further examples of electroactive sulfur-containing materials include those comprising disulfide groups as described, for example in, U.S. Pat. No. 4,739,018 to Armand et al.; U.S. Pat. Nos. 4,833,048 and 4,917,974, both to De Jonghe et al.; U.S. Pat. Nos. 5,162,175 and 5,516,598, both to Visco et al.; and U.S. Pat. No. 5,324,599 to Oyama et al.

While sulfur, as an active cathode species, is described predominately, it is to be understood that wherever sulfur is described as a component of the electrode active material herein, any suitable cathode active species may be used. For example, in certain embodiments, the cathode active species comprises a hydrogen-absorbing alloy, such as those commonly used in nickel metal hydride batteries. One of ordinary skill in the art, given the present disclosure, would be capable of extending the ideas described herein to electrochemical cells containing electrodes employing other cathode active materials.

In certain embodiments (e.g., in certain embodiments in which sulfur is used as a cathode active material), the anode can comprise lithium as an anode active material. Suitable electrode active materials comprising lithium include, but are not limited to, lithium metal such as lithium foil and lithium deposited onto a conductive substrate, and lithium alloys (e.g., lithium-aluminum alloys and lithium-tin alloys). In some embodiments, an electroactive lithium-containing material of an anode active layer comprises greater than 50 wt % lithium. In some cases, the electroactive lithium-containing material of an anode active layer comprises greater than 75 wt % lithium. In still other embodiments, the electroactive lithium-containing material of an anode active layer comprises greater than 90 wt % lithium. Other examples of anode active materials that can be used include, but are not limited to, other alkali metals (e.g., sodium, potassium, rubidium, caesium, francium), alkaline earth metals (e.g., beryllium, magnesium, calcium, strontium, barium, radium), and the like.

The electrode and porous support structure configurations described herein can be used in a variety of devices. In certain embodiments, the electrodes and/or porous support structures described herein can be configured for use in an electrochemical cell. The electrodes and/or porous support structures described herein can be used in electrochemical cells for a wide variety of devices, such as, for example, electric vehicles, load-leveling devices (e.g., for solar- or wind-based energy platforms), portable electronic devices, and the like. The term "electrochemical cell" includes primary and secondary electrochemical cells. Accordingly, the inventive electrochemical cell arrangements and materials described herein can be used in primary cells and/or in secondary cells (including primary batteries and secondary batteries), which can be charged and discharged numerous times. In some embodiments, the materials, systems, and methods described herein can be used in association with lithium-based electrochemical cells, and batteries thereof. For example, in certain embodiments, the electrodes comprising the porous support structures described herein can be used in electrochemical cells comprising another electrode comprising lithium, such as lithium metal and/or a lithium alloy. In certain embodiments, the porous support structures and/or electrodes described herein can be used in lithium-sulfur batteries.

Figure 3:
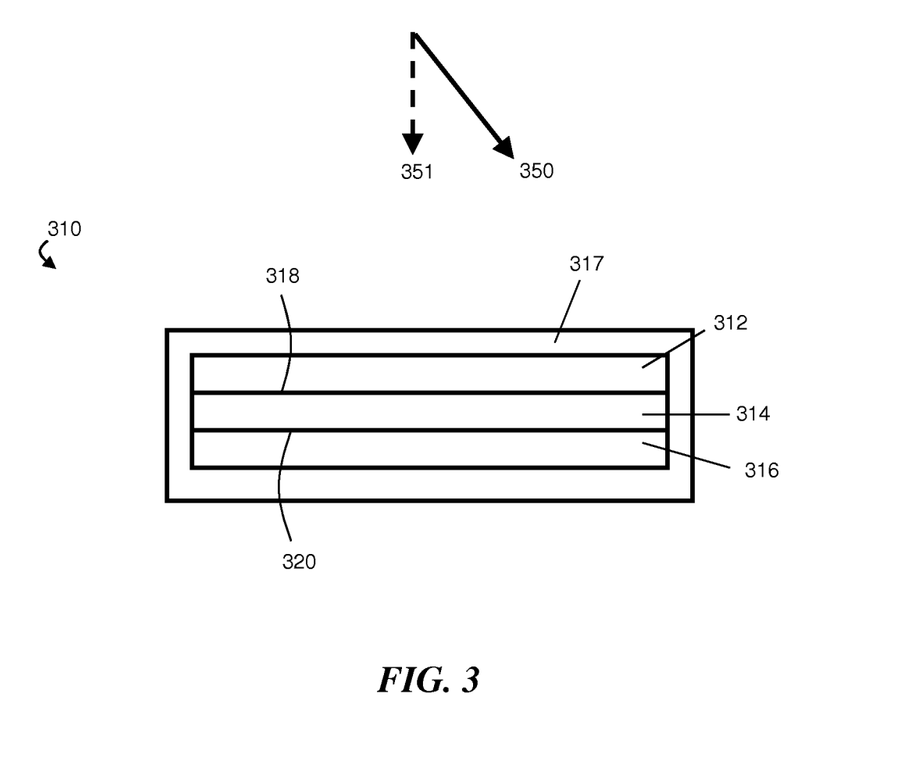
FIG. 3 is an exemplary cross-sectional schematic illustration of an electrochemical cell.

Although the present invention can find use in a wide variety of electrochemical devices, an example of one such device is provided in FIG. 3 for illustrative purposes only. FIG. 3 includes a schematic illustration of an electrochemical cell 310 comprising a cathode 312 and an anode 316. In addition, the electrochemical cell comprises electrolyte 314. The electrolyte can include one or more components in electrochemical communication with the cathode and the anode. While the anode, cathode, and electrolyte in FIG. 3 are shown as having a planar configuration, other embodiments may include non-planar configurations (e.g., cylindrical, serpentine, etc.). In FIG. 3, electrochemical cell 310 also includes a housing structure 317.

Of course, the orientation of the components can be varied, and it should be understood that there are other embodiments in which the orientation of the layers is varied. Additionally, non-planar arrangements, arrangements with proportions of materials different than those shown, and other alternative arrangements are useful in connection with the present invention. A typical electrochemical cell also would include, of course, current collectors, external circuitry, and the like. Those of ordinary skill in the art are well aware of the many arrangements that can be utilized with the general schematic arrangement as shown in the figures and described herein.

Electrodes comprising the porous support structures described herein can be used as anodes and/or cathodes. In certain embodiments, cathode 312 of electrochemical cell 310 can comprise a porous support structure made by at least partially removing a component of a metal alloy. In some such embodiments, anode 316 comprises lithium (e.g., lithium metal and/or a lithium alloy) as an active species.

In certain embodiments, electrochemical cells described herein can comprise a separator (e.g., a porous separator used in conjunction with, for example, a liquid electrolyte). For example, in certain embodiments, electrochemical cell 310 comprises a separator positioned between cathode 312 and anode 316. In some such embodiments, the porous support structures described herein can be configured and/or the separator can be selected and/or configured such that the root mean square surface roughness of the porous support structure is less than the thickness of the separator. Configuring the electrochemical cell in this way can reduce the risk that the surface roughness of the porous support structure (and hence, the surface roughness of the electrode) will cause the separator to tear or otherwise break, which could result in short-circuiting of the electrochemical cell. In some embodiments, electrochemical cells comprise an electrode comprising a porous support structure configured such that the external geometric surface of the porous support structure that faces the separator (e.g., that is in contact with the separator) has a root mean square surface roughness that is less than 100%, less than 50%, less than 25%, or less than 10% of the average thickness of the separator. One of ordinary skill in the art would be capable of determining the average thickness of a separator by measuring the thickness of the separator at a representative number of points and calculating the numeric average of the results (i.e., summing the values of the measurements and dividing the sum by the number of measurements).

In certain embodiments, the porous support structures and electrodes described herein can be configured for use in electrochemical cells in which an anisotropic force is applied to the cell. Accordingly, in certain embodiments, the porous support structures and electrodes described herein can be configured to withstand an applied anisotropic force (e.g., a force applied to enhance the morphology of the other electrode) while maintaining their structural integrity (including void volume, in certain embodiments). In certain embodiments, the porous support structures and electrodes described herein can be part of (or can be configured to be a part of) an electrochemical cell that is constructed and arranged to apply, during at least one period of time during charge and/or discharge of the cell, an anisotropic force with a component normal to the active surface of an electrode within the electrochemical cell (e.g., an anode comprising lithium metal and/or a lithium alloy). In one set of embodiments, the applied force can be selected to enhance the morphology of an electrode (e.g., an anode such as a lithium metal and/or alloy anode), and the other electrode (e.g., cathode) can comprise a porous support structure made by at least partially removing a component of a metal alloy.

An "anisotropic force" is given its ordinary meaning in the art and means a force that is not equal in all directions. A force equal in all directions is, for example, internal pressure of a fluid or material within the fluid or material, such as internal gas pressure of an object. Examples of forces not equal in all directions include forces directed in a particular direction, such as the force on a table applied by an object on the table via gravity. Another example of an anisotropic force includes a force applied by a band arranged around a perimeter of an object. For example, a rubber band or turnbuckle can apply forces around a perimeter of an object around which it is wrapped. However, the band may not apply any direct force on any part of the exterior surface of the object not in contact with the band. In addition, when the band is expanded along a first axis to a greater extent than a second axis, the band can apply a larger force in the direction parallel to the first axis than the force applied parallel to the second axis.

In certain such cases, the anisotropic force comprises a component normal to an active surface of an electrode within an electrochemical cell. As used herein, the term "active surface" is used to describe a surface of an electrode that is in physical contact with the electrolyte and at which electrochemical reactions may take place. For example, referring back to FIG. 3, cathode 312 can include cathode active surface 318 and/or anode 316 can include anode active surface 320. One of ordinary skill in the art would understand that an active surface of an electrode refers to a geometric surface of the electrode, which will be understood by those of ordinary skill in the art to refer to a surface defined by the outer boundaries of the electrode, for example, the area that may be measured by a macroscopic measuring tool (e.g., a ruler), and does not include the internal surface area (e.g., area within pores of a porous material such as a porous support structure).

A force with a "component normal" to a surface is given its ordinary meaning as would be understood by those of ordinary skill in the art and includes, for example, a force which at least in part exerts itself in a direction substantially perpendicular to the surface. For example, in the case of a horizontal table with an object resting on the table and affected only by gravity, the object exerts a force essentially completely normal to the surface of the table. If the object is also urged laterally across the horizontal table surface, then it exerts a force on the table which, while not completely perpendicular to the horizontal surface, includes a component normal to the table surface. Those of ordinary skill can understand other examples of these terms, especially as applied within the description of this document.

An applied force with a component normal to an active surface of an electrode is illustrated in FIG. 3. In FIG. 3, an anisotropic force may be applied in the direction of arrow 350. Arrow 351 illustrates the component of force 350 that is normal to active surface 320 of anode 316 (and also, in this case, normal to active surface 318 of cathode 312). In the case of a curved surface (for example, a concave surface or a convex surface), the component of the anisotropic force that is normal to an active surface of an electrode may correspond to the component normal to a plane that is tangent to the curved surface at the point at which the anisotropic force is applied. The anisotropic force may be applied, in some cases, at one or more pre-determined locations, optionally distributed over the active surface of the electrode (e.g., anode). In some embodiments, the anisotropic force is applied uniformly over the active surface of the electrode (e.g., anode).

Any of the electrode properties (e.g., porosities, pore size distributions, etc.) and/or performance metrics described herein may be achieved, alone or in combination with each other, while an anisotropic force is applied to the electrochemical cell (e.g., during charge and/or discharge of the cell). In certain embodiments, the anisotropic force applied to a porous support structure, to an electrode, and/or to an electrochemical cell containing the electrode (e.g., during at least one period of time during charge and/or discharge of the cell) can include a component normal to an active surface of an electrode (e.g., an anode such as a lithium metal and/or lithium alloy anode within the electrochemical cell and/or the porous electrode comprising multiple porous support structures). In certain embodiments, the component of the anisotropic force that is normal to the active surface of the electrode defines a pressure of at least about 20, at least about 25, at least about 35, at least about 40, at least about 50, at least about 75, at least about 90, at least about 100, at least about 125 or at least about 150 Newtons per square centimeter, while the desired electrode properties are present. In certain embodiments, the component of the anisotropic force normal to the active surface may, for example, define a pressure of less than about 200, less than about 190, less than about 175, less than about 150, less than about 125, less than about 115, or less than about 110 Newtons per square centimeter, while the desired electrode properties are present. While forces and pressures are generally described herein in units of Newtons and Newtons per unit area, respectively, forces and pressures can also be expressed in units of kilograms-force and kilograms-force per unit area, respectively. One of ordinary skill in the art will be familiar with kilogram-force-based units, and will understand that 1 kilogram-force is equivalent to about 9.8 Newtons.

In certain embodiments, the void volumes and/or pore distributions described herein can be achieved while an anisotropic force (e.g., having a component normal to an active surface of an electrode that defines a pressure of between about 20 Newtons/cm$^2$ and about 200 Newtons/cm$^2$, or within any of the ranges outlined above) is applied to the electrode (e.g., via application of an anisotropic force to an electrochemical cell containing the electrode). This can be accomplished by fabricating a porous support structure within the electrode that is capable of maintaining its porosity under an applied force, as described above. A porous support structure that resists deformation under an applied force can allow the electrode containing the porous support structure to maintain its permeability under pressure, and can allow the electrode to maintain the enhanced rate capabilities described herein.

The anisotropic forces described herein may be applied using any method known in the art. In some embodiments, the force may be applied using compression springs. Forces may be applied using other elements (either inside or outside a containment structure) including, but not limited to Belleville washers, machine screws, pneumatic devices, and/or weights, among others. In some cases, cells may be pre-compressed before they are inserted into containment structures, and, upon being inserted to the containment structure, they may expand to produce a net force on the cell. Suitable methods for applying such forces are described in detail, for example, in U.S. patent application Ser. No. 12/535,328, filed Aug. 4, 2009, entitled "Application of Force in Electrochemical Cells" to Scordilis-Kelley et al. which are incorporated herein by reference in their entirety.

As noted elsewhere, a wide variety of metals can be used in association with the embodiments described herein (e.g., as metal porous support structures and/or within a starting metal alloy used to form a metal porous support structure). Suitable metals include, for example, alkalai metals (e.g., lithium, sodium, potassium, rubidium, cesium, and/or francium), alkaline earth metals (e.g., beryllium, magnesium, calcium, strontium, barium, and/or radium), transition metals (e.g., scandium, titanium, vanadium, chromium, manganese, iron, cobalt, nickel, copper, zinc, yttrium, zirconium, niobium, molybdenum, technetium, ruthenium, rhodium, palladium, silver, cadmium, hafnium, tantalum, tungsten, rhenium, osmium, iridium, platinum, and/or gold), lanthanides (e.g., lanthanum, cerium, praseodymium, neodymium, promethium, samarium, europium, gadolinium, terbium, dysprosium, holmium, erbium, thulium, ytterbium, and/or lutetium), actinides (e.g., actinium, thorium, protactinium, uranium, neptunium, plutonium, americium, curium, berkelium, californium, einsteinium, fermium, mendelevium, nobelium, and/or lawrencium), and/or post transition metals (e.g., aluminum, gallium, indium, tin, thallium, lead, and/or bismuth).

In certain embodiments, the porous support structure comprises a material with a bulk electrical resistivity of less than about $10^{-3}$ ohm-m, less than about $10^{-4}$ ohm-m, or less than about $10^{-5}$ ohm-m at 20° C. For example, in some embodiments, all or part of the porous support structure can be formed of nickel, which has a bulk electrical resistivity of about $7 \times 10^{-8}$ ohm-m at 20° C. In certain embodiments, at least about 50 wt %, at least about 75 wt %, at least about 90 wt %, at least about 95 wt %, or at least about 99 wt % of the porous support structure is made up of material(s) having bulk electrical resistivities of less than about $10^{-3}$ ohm-m or less than about $10^{-6}$ ohm-m at 20° C.

The following documents are incorporated herein by reference in their entireties for all purposes: U.S. Pat. No. 7,247,408, filed May 23, 2001, entitled "Lithium Anodes for Electrochemical Cells"; U.S. Pat. No. 5,648,187, filed Mar. 19, 1996, entitled "Stabilized Anode for Lithium-Polymer Batteries"; U.S. Pat. No. 5,961,672, filed Jul. 7, 1997, entitled "Stabilized Anode for Lithium-Polymer Batteries"; U.S. Pat. No. 5,919,587, filed May 21, 1997, entitled "Novel Composite Cathodes, Electrochemical Cells Comprising Novel Composite Cathodes, and Processes for Fabricating Same"; U.S. patent application Ser. No. 11/400,781, filed Apr. 6, 2006, published as U.S. Pub. No. 2007-0221265, and entitled "Rechargeable Lithium/Water, Lithium/Air Batteries"; International Patent Apl. Serial No.: PCT/US2008/009158, filed Jul. 29, 2008, published as International Pub. No. WO/2009017726, and entitled "Swelling Inhibition in Lithium Batteries"; U.S. patent application Ser. No. 12/312,764, filed May 26, 2009, published as U.S. Pub. No. 2010-0129699, and entitled "Separation of Electrolytes"; International Patent Apl. Serial No.: PCT/US2008/012042, filed Oct. 23, 2008, published as International Pub. No. WO/2009054987, and entitled "Primer for Battery Electrode"; U.S. patent application Ser. No. 12/069,335, filed Feb. 8, 2008, published as U.S. Pub. No. 2009-0200986, and entitled "Protective Circuit for Energy-Storage Device"; U.S. patent application Ser. No. 11/400,025, filed Apr. 6, 2006, published as U.S. Pub. No. 2007-0224502, and entitled "Electrode Protection in both Aqueous and Non-Aqueous Electrochemical Cells, including Rechargeable Lithium Batteries"; U.S. patent application Ser. No. 11/821,576, filed Jun. 22, 2007, published as U.S. Pub. No. 2008/0318128, and entitled "Lithium Alloy/Sulfur Batteries"; patent application Ser. No. 11/111,262, filed Apr. 20, 2005, published as U.S. Pub. No. 2006-0238203, and entitled "Lithium Sulfur Rechargeable Battery Fuel Gauge Systems and Methods"; U.S. patent application Ser. No. 11/728,197, filed Mar. 23, 2007, published as U.S. Pub. No. 2008-0187663, and entitled "Co-Flash Evaporation of Polymerizable Monomers and Non-Polymerizable Carrier Solvent/Salt Mixtures/Solutions"; International Patent Apl. Serial No.: PCT/US2008/010894, filed Sep. 19, 2008, published as International Pub. No. WO/2009042071, and entitled "Electrolyte Additives for Lithium Batteries and Related Methods"; International Patent Apl. Serial No.: PCT/US2009/000090, filed Jan. 8, 2009, published as International Pub. No. WO/2009/089018, and entitled "Porous Electrodes and Associated Methods"; U.S. patent application Ser. No. 12/535,328, filed Aug. 4, 2009, published as U.S. Pub. No. 2010/0035128, and entitled "Application of Force In Electrochemical Cells"; U.S. patent application Ser. No. 12/727,862, filed Mar. 19, 2010, entitled "Cathode for Lithium Battery"; U.S. patent application Ser. No. 12/471,095, filed May 22, 2009, entitled "Hermetic Sample Holder and Method for Performing Microanalysis Under Controlled Atmosphere Environment"; U.S. patent application Ser. No. 12/862,513, filed on Aug. 24, 2010, entitled "Release System for Electrochemical cells (which claims priority to Provisional Patent Apl. Ser. No. 61/236,322, filed Aug. 24, 2009, entitled "Release System for Electrochemical Cells"); U.S. patent application Ser. No. 13/216,559, filed on Aug. 24, 2011, published as U.S. Patent Publication No. 2012/0048729, entitled "Electrically Non-Conductive Materials for Electrochemical Cells;" U.S. Provisional Patent Apl. Ser. No. 61/376,554, filed on Aug. 24, 2010, entitled "Electrically Non-Conductive Materials for Electrochemical Cells;" U.S. patent application Ser. No. 12/862,528, filed on Aug. 24, 2010, published as U.S. Patent Publication No. 2011/0177398, entitled "Electrochemical Cell;" U.S. patent application Ser. No. 12/862,563, filed on Aug. 24, 2010, published as U.S. Pub. No. 2011/0070494, entitled "Electrochemical Cells Comprising Porous Structures Comprising Sulfur" [S1583.70029US500]; U.S. patent application Ser. No. 12/862,551, filed on Aug. 24, 2010, published as U.S. Pub. No. 2011/0070491, entitled "Electrochemical Cells Comprising Porous Structures Comprising Sulfur" [S1583.70030US00]; U.S. patent application Ser. No. 12/862,576, filed on Aug. 24, 2010, published as U.S. Pub. No. 2011/0059361, entitled "Electrochemical Cells Comprising Porous Structures Comprising Sulfur" [S1583.70031US00]; U.S. patent application Ser. No. 12/862,581, filed on Aug. 24, 2010, published as U.S. Pub. No. 2011/0076560, entitled "Electrochemical Cells Comprising Porous Structures Comprising Sulfur" [S1583.70024US01]; U.S. patent application Ser. No. 13/240,113, filed on Sep. 22, 2011, published as U.S. Patent Pub. No. 2012/0070746, entitled "Low Electrolyte Electrochemical Cells"; U.S. Patent Apl. Ser. No. 61/385,343, filed on Sep. 22, 2010, entitled "Low Electrolyte Electrochemical Cells"; and U.S. patent application Ser. No. 13/033,419, filed Feb. 23, 2011, published as U.S. Patent Pub. No. 2011/0206992, entitled "Porous Structures for Energy Storage Devices" [S1583.70034US00]. U.S. Provisional Patent Application Ser. No. 61/608,950, filed Mar. 9, 2012, and entitled "Porous Support Structures, Electrodes Containing Same, and Associated Methods" is also incorporated herein by reference in its entirety for all purposes. All other patents and patent applications disclosed herein are also incorporated by reference in their entirety for all purposes.

The following examples are intended to illustrate certain embodiments of the present invention, but do not exemplify the full scope of the invention.

PROPHETIC EXAMPLE 1

This example describes the prophetic fabrication of an electrode using a nickel-aluminum alloy foil to form a porous support structure. Foils with thicknesses of about 100 micrometers can be made from nickel-aluminum alloys. One example of a suitable alloy comprises 30 wt % Ni and 70 wt % Al. The foil can be treated with a 5 Molar aqueous solution of NaOH at 80° C. for 18 hours. After treatment with the NaOH solution, the foil can be rinsed with copious amounts of water to remove NaOH and $NaAl(OH)_4$ (a product that is generally formed with Al is dissolved in hydroxide-containing solutions). The rinsed porous foil can be treated at 120° C. to remove water.

Porous foils fabricated using this procedure are expected to have a porosity of about 80%, with pores of about 2 micrometers. In addition, the porous foils are expected to have smooth external geometric surfaces with RMS surface roughnesses of below about 10 micrometers.

Porous foils fabricated as outlined above can be used as porous supports to which sulfur-containing materials can be added to form electrodes. For example, the porous foil can be exposed to a solution containing elemental sulfur dissolved in toluene. The toluene can be allowed to evaporate, leaving behind elemental sulfur in the pores of the porous foil. It is expected that sulfur surfaces loadings of about 2 $mg/cm^2$ of the surface area of the support structure (including internal, porous surface area) can be achieved using these methods.

Electrodes fabricated as described above can be used as cathodes in lithium-sulfur batteries. For example, the porous foil loaded with sulfur can be assembled into a pouch cell including a 2 mil lithium foil anode, a 25 micrometers Celgard 2325 separator, and a liquid electrolyte. An exemplary electrolyte formulation can include 40 wt % 1,2-dimethoxyethane, 40 wt % 1,3-Dioxolane, 16 wt % LiTFSI, and 4 wt % $LiNO_3$. The cell can be kept under an applied anisotropic force defining a pressure of about 10 $kg/cm^2$. The cell can be discharged at a current density of 0.4 $mA/cm^2$ to a voltage of 1.7 V. It is expected that the specific energy density of such an electrochemical cell would be about 1200-1300 mAh/g.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, and/or method described herein. In addition, any combination of two or more such features, systems, articles, materials, and/or methods, if such features, systems, articles, materials, and/or methods are not mutually inconsistent, is included within the scope of the present invention.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A method of making an electrode, comprising:
depositing an electrode active material within the pores of a porous support structure that is made by removing at least a portion of at least one metal component from a metal alloy comprising nickel and aluminum.

2. The method of claim 1, further comprising removing at least a portion of at least one metal component from a metal alloy to produce the porous support structure.

3. The method of claim 1, wherein removing at least a portion of at least one metal component from the metal alloy comprises chemically treating at least a portion of the at least one metal component.

4. The method of claim 1, wherein removing at least a portion of at least one metal component from the metal alloy comprises melting at least a portion of the at least one metal component.

5. The method of claim 4, wherein melting at least a portion of the at least one metal component comprises heating the metal alloy to a temperature above the melting point of the at least one metal component and below the melting point of at least one other component of the metal alloy.

6. The method of claim 1, wherein the metal alloy further comprises iron, titanium, and/or copper.

7. The method of claim 1, wherein removing at least a portion of the at least one metal component comprises removing at least some aluminum from the metal alloy.

8. The method of claim 1, wherein the metal component that is at least partially removed from the metal alloy is present within the metal alloy in an amount between about 40 wt % and about 95 wt % prior to removing the component from the metal alloy.

9. The method of claim 1, wherein the metal alloy comprises a first metal component and a second metal component, and the ratio of the volume of the first metal component removed from the metal alloy to the volume of the second metal component removed from the metal alloy is at least about 10:1.

10. A method of making an electrode, comprising:
depositing an electrode active material within the pores of a porous support structure that is made by removing at least portions of at least two metal components from a metal alloy.

11. The method of claim 10, further comprising removing at least portions of at least two metal components from a metal alloy to produce the porous support structure.

12. The method of claim 10, wherein removing at least portions of at least two metal components from the metal alloy comprises chemically treating at least a portion of at least one of the metal components.

13. The method of claim 10, wherein removing at least portions of at least two metal components from the metal alloy comprises melting at least a portion of at least one of the metal components.

14. The method of claim 13, wherein melting at least a portion of the at least one metal component comprises heating the metal alloy to a temperature above the melting point of the at least one metal component and below the melting point of at least one other component of the metal alloy.

15. The method of claim 10, wherein the metal alloy comprises aluminum, nickel, iron, titanium, and/or copper.

16. The method of claim 15, wherein the metal alloy comprises nickel and aluminum.

17. The method of claim 10, wherein removing at least portions of at least two metal components comprises removing at least some aluminum from the metal alloy.

18. The method of claim 10, wherein at least one of the metal components that is at least partially removed from the metal alloy is present within the metal alloy in an amount between about 40 wt % and about 95 wt % prior to removing the components from the metal alloy.

19. The method of claim 10, wherein a ratio of the volume of a first of the metal components that is at least partially removed from the metal alloy to the volume of a second of the metal components that is at least partially removed from the metal alloy is at least about 10:1.

* * * * *